UNITED STATES PATENT OFFICE.

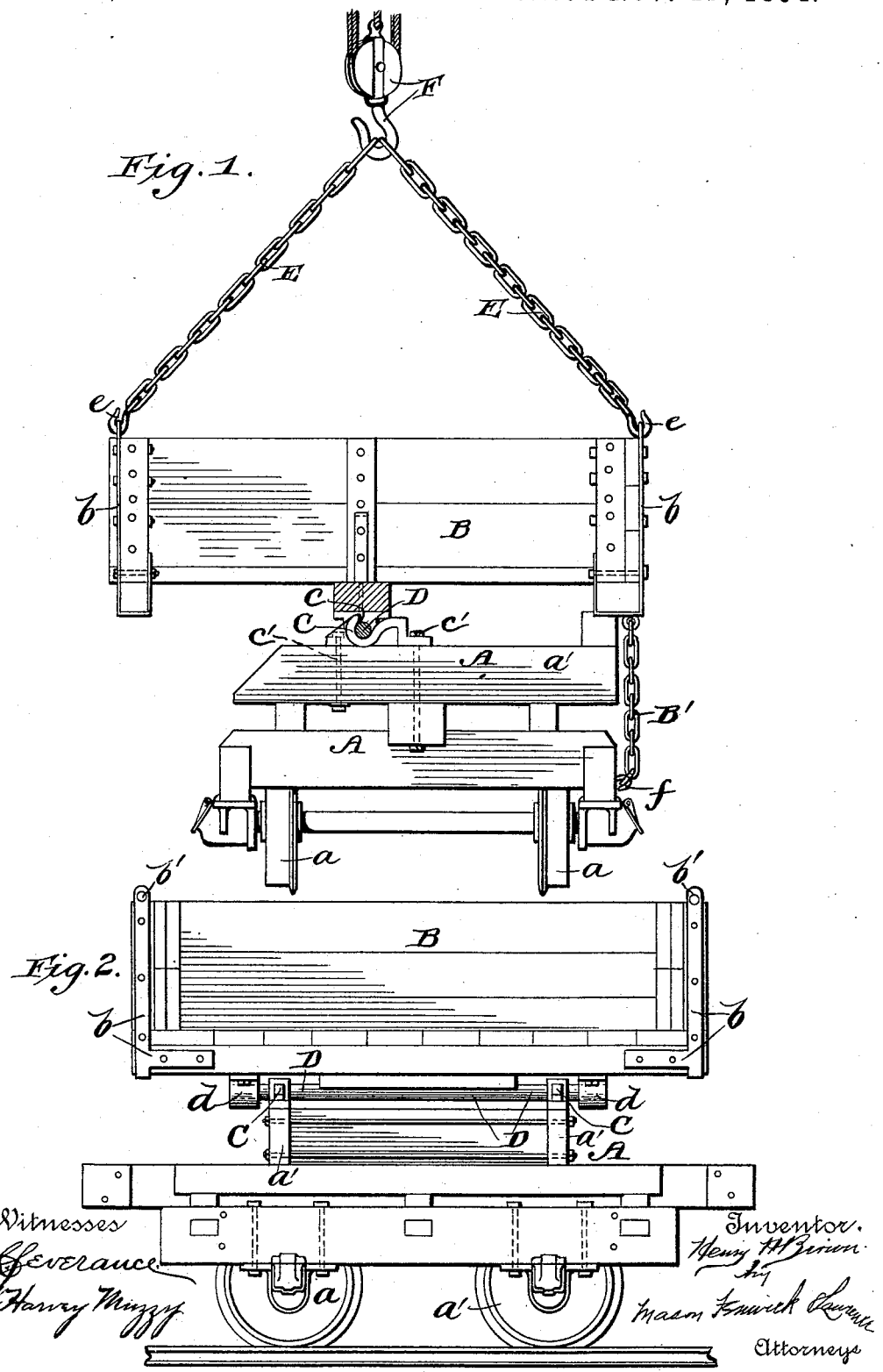

HENRY H. BROWN, OF NEW YORK, N. Y.

DUMPING-CAR.

SPECIFICATION forming part of Letters Patent No. 529,108, dated November 13, 1894.

Application filed April 4, 1894. Serial No. 506,309. (No model.)

*To all whom it may concern:*

Be it known that I, HENRY H. BROWN, a citizen of the United States, residing at New York, in the county of New York and State of New York, have invented certain new and useful Improvements in Dumping-Cars; and I do hereby declare the following to be a full, clear, and exact description of the invention, such as will enable others skilled in the art to which it appertains to make and use the same.

My invention relates to improvements in dumping cars and it consists in the combination of a wheel truck provided with hook shaped shaft or journal bearings, open at the top, a dumping car body provided with an axial shaft which fits into said hook bearings; said car body being held firmly on said truck during the carrying and dumping operations but being capable of being instantly removed therefrom at will and without the necessity of adjusting or altering any of the parts to permit said removal.

It also consists in the combination of a wheel truck, a dumping car body mounted upon the same and provided with devices by which it is held on said truck but which permit its removal at will and means connected to said car body by which it is removed from or replaced on the truck when desired. These devices are more fully set forth and described in the following specification and illustrated in the accompanying drawings, in which latter—

Figure 1. represents an end elevation, partly in section, of the devices embodying my invention, and Fig. 2. represents a side elevation of the said devices.

A in the drawings represents the frame of the wheel truck; a, the wheels upon which it is mounted; B, the dumping car body; C, the hook bearing blocks attached to said truck; D, the axial shaft attached to the car, and b and E the means whereby the car body is removed from the truck and replaced upon the same.

The truck frame A is of any ordinary construction usually employed in frames for dumping cars and is provided upon its cross beams a', at each end, with bearing blocks C. These blocks are provided upon their upper faces with hook shaped recesses c open at the top and are secured to said cross beams by means of bolts c' which pass through each end of said blocks and the said cross beams. The hook shaped recesses are adapted to receive and hold the axial shaft D which is attached to the bottom of the car body at about the middle, by means of hangers d; said shaft having its ends secured rigidly in said hangers.

Iron brackets b are secured on each side, at the ends of the car, and are provided with eyes b' at their upper ends. These eyes receive hooks e of chains E which are adapted to be engaged by the crane tackle F and thereby lift the car from the truck.

The bearing blocks C are so situated that the car body overhangs one side of the truck more than the other and thus when it is desired to dump the car it is tipped to this side and its contents quickly spilled or dumped.

Chains B' are attached to the opposite side of the car body and are secured to the truck by any suitable hooks f and thus the car body is kept in its horizontal position when it is not desired to dump it.

It will be seen from the foregoing that the car body is supported firmly on the truck without any danger of being displaced when being transported or dumped and yet it can be instantly removed when so desired.

When the car body is removed, by a suitable crane and tackle, to be filled, the axial shaft D slips diagonally out of the bearing blocks and the car is raised clear of the truck and then lowered to the desired position to be filled. When the car is replaced on the truck the said axial shaft glides diagonally into the hook bearing and the weight of the load in the car keeps the latter firmly seated on the truck while being transported.

During the dumping operation the car is prevented from slipping from the truck by the axial shaft bearing against the upturned hooked ends of the hook bearing blocks.

What I claim as my invention is—

A dumping car, comprising a side dumping car body provided with attachments to which lifting means may be coupled and the body moved bodily off the truck frame, and with an axial shaft along its center, and a truck provided with hook shaped bearing blocks in which the axial shaft is always seated when the car body is on the truck, said blocks being adapted to hold the ends of the axial shaft against incidental upward and lateral displacement, but allow them to be withdrawn diagonally upward; said blocks being also mounted considerably to one side of the center of the truck so that the car body will project over one side of the truck at all times and will always be in position to automatically dump when released, and means for holding the car body in a horizontal position, substantially as described.

In testimony whereof I hereunto affix my signature in presence of two witnesses.

HENRY H. RROWN.

Witnesses:
HAROLD C. DAYTON,
WILLIAM ROBBINS.